(12) United States Patent
Stebelton

(10) Patent No.: US 6,799,755 B1
(45) Date of Patent: Oct. 5, 2004

(54) NON-DISTORTION CLAMP

(75) Inventor: Roger L. Stebelton, Carroll, OH (US)

(73) Assignee: Dana Corporation, Toledo, OH (US)

( * ) Notice: Subject to any disclaimer, the term of this patent is extended or adjusted under 35 U.S.C. 154(b) by 79 days.

(21) Appl. No.: 10/071,935

(22) Filed: Feb. 7, 2002

(51) Int. Cl.⁷ ................................................. B23Q 1/12
(52) U.S. Cl. ......................................... 269/75; 269/246
(58) Field of Search ............................. 269/75, 71, 95, 269/99, 100, 246, 900

(56) References Cited

U.S. PATENT DOCUMENTS

| | | |
|---|---|---|
| 10,985 A | 5/1854 | Gregg |
| 1,611,738 A | 12/1926 | Guilford |
| 1,933,718 A | 11/1933 | DeVincenzi |
| 2,928,686 A | 3/1960 | Newkirk |
| 3,815,892 A | 6/1974 | Tulk |
| 4,729,552 A * | 3/1988 | Pempek .................. 269/71 |
| 6,170,372 B1 | 1/2001 | Weaver |

* cited by examiner

Primary Examiner—Robert C. Watson
(74) Attorney, Agent, or Firm—Dykema Gossett PLLC

(57) ABSTRACT

A clamp for gripping a part or workpiece is provided in which the arms of the clamp securely engage the part before being locked in place relative to the body of the clamp. The clamp includes a body and first and second arms extending from the body. The clamp further includes a nut disposed in one of the two arms and a fastener extending through portions of both arms. Rotation of the fastener causes movement of the nut along a first axis which causes a corresponding movement in a pushrod disposed in the same arm as the nut along a second axis perpendicular to the first axis. The pushrod engages a plate disposed within the body of the clamp to lock the arms of the clamp relative to the clamp body.

20 Claims, 2 Drawing Sheets

NON-DISTORTION CLAMP

BACKGROUND OF THE INVENTION

1. Field of the Invention

This invention relates to a clamp and, in particular, to a clamp in which the components of the clamp are locked into place after the clamp has gripped a part.

2. Discussion of Related Art

In a conventional clamp used to grip a part, or a workpiece, the arms of the clamp engage the part and are simultaneously locked into place relative to the body of the clamp. Because these events occur simultaneously, the part being gripped is susceptible to movement from a desired position. Further, conventional clamps can only be used on parts in limited numbers. In particular, three clamps are normally used to hold a part having an uneven surface. The use of additional clamps can cause distortion of the part.

The inventors herein have recognized a need for a clamp that will minimize and/or eliminate one or more of the above-identified deficiencies.

SUMMARY OF THE INVENTION

The present invention provides a clamp for gripping a part.

A clamp in accordance with the present invention includes a body and first and second arms. The body defines an opening that is closed at one end by a plate. The first arm is partially disposed within the opening and extends outwardly therefrom. The second arm is partially disposed about the body and spaced from the first arm. The first and second arms are configured to engage first and second sides, respectively, of the part. The clamp further includes an assembly having first, second, and third members. The first member extends along a first axis through at least portions of the first and second arms. The second member is disposed within a first bore in the first arm and is configured to receive the first member of the assembly. The third member is disposed within a second bore in the first arm and is disposed about a second axis extending perpendicular to the first axis. Rotation of the first member in a first rotational direction causes movement of the second member along the first axis in a first axial direction. This action causes a corresponding movement of the third member along the second axis whereby the third member engages the plate in the body of the clamp to secure a position of the first and second arms relative to the body.

A clamp in accordance with the present invention represents a significant improvement as compared to conventional clamps. First, the inventive clamp is able to grip a part securely in a desired position before the components of the clamp are locked into place. As a result, the part does not move as the clamp is locked into place. Second, the inventive clamp can be used in any number without causing distortion of the part.

These and other advantages of this invention will become apparent to one skilled in the art from the following detailed description and the accompanying drawings illustrating features of this invention by way of example.

DETAILED DESCRIPTION OF ONE OR MORE EMBODIMENTS OF THE INVENTION

Figure 1:
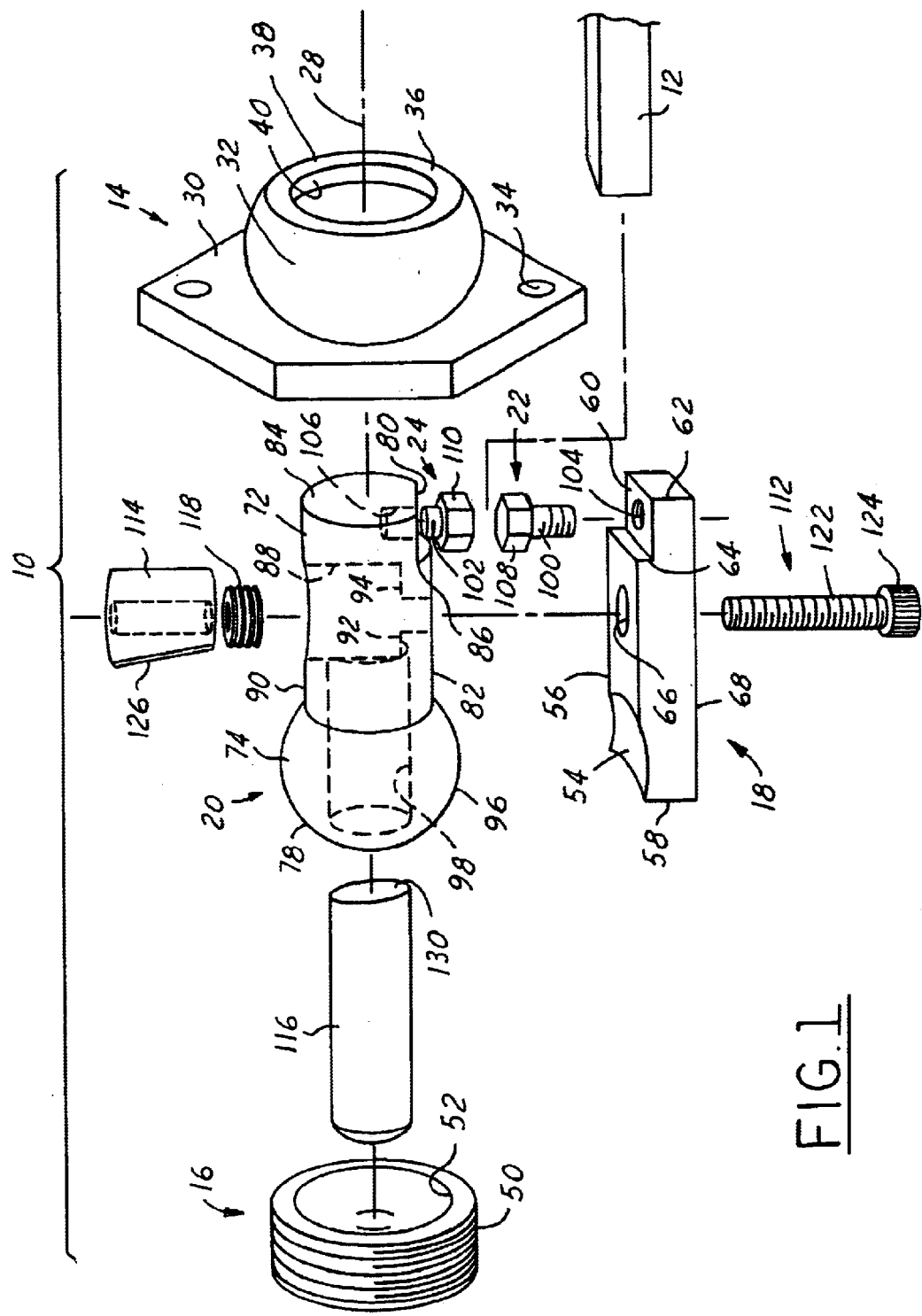
FIG. 1 is an exploded perspective view of a clamp for gripping a part in accordance with the present invention.
Figure 2:
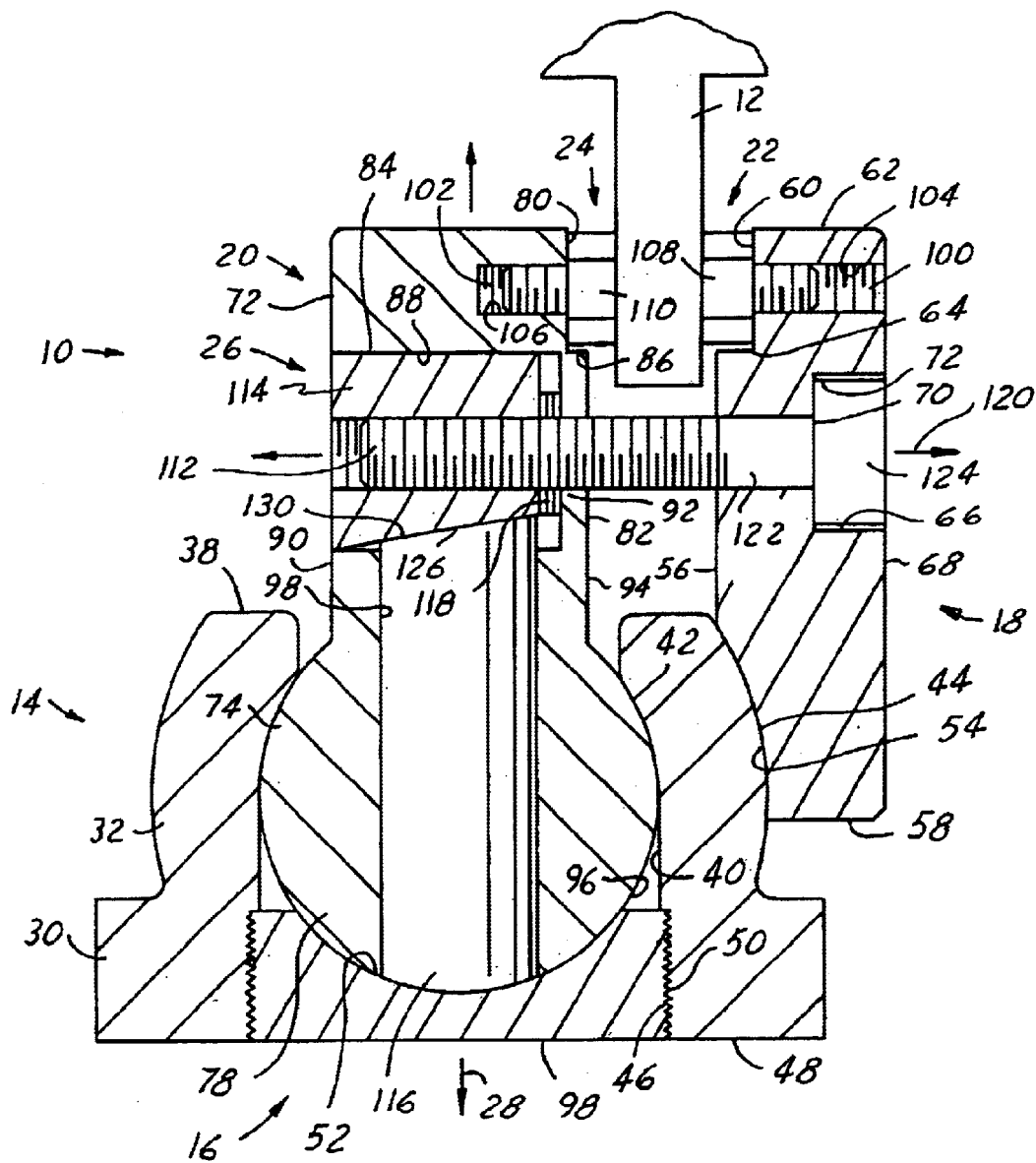
FIG. 2 is a cross-sectional view of the clamp of FIG. 1 upon assembly.

Referring now to the drawings wherein like reference numerals are used to identify identical components in the various views, FIGS. 1–2 illustrate one embodiment of a clamp 10 in accordance with the present invention. Clamp 10 is provided to grip a workpiece or part 12. Part 12 may, for example, comprise any of a variety of castings found in vehicles such as an axle housing. It should be understood, however, that clamp 10 may be used to grip a wide variety of parts. Clamp 10 is particularly advantageous in gripping parts that have uneven surfaces. Again, however, it should be understood that clamp 10 may be used to grip parts having even surfaces and parts having a variety of surface and structural characteristics. Clamp 10 may include a body 14, a plate 16, arms 18, 20, wear pads 22, 24, and means, such as assembly 26, for securing the position of arms 18, 20 relative to body 14.

Body 14 provides structural support for arms 18, 20. Body 14 may be made from conventional metals and metal alloys such as steel. Body 14 is disposed about an axis 28 and includes a base portion 30 and a semi-spherical portion 32. In the illustrated embodiment base portion 30 is hexagonal in shape. It should be understood, however, that base portion 30 may assume a wide variety of shapes and configurations without departing from the spirit of the present invention. Base portion 30 defines one or more apertures 34 that are configured to receive fasteners (not shown) such as a screw or bolt used to secure clamp 10 to another physical structure such as a table (not shown). Portion 32 is integral with portion 30 in the illustrated embodiment. Alternatively, however, portions 30, 32 may be separate and coupled together upon assembly of clamp 10. Portion 32 may further define a flat annular face 36 at one axial end 38 of body 14 as shown in the illustrated embodiment.

Body 14 defines an opening 40 that is centered about axis 28 and extends through both of portions 30, 32. Opening 40 is generally circular in axial cross-section. The diameter of opening 40, however, narrows proximate end 38 of body 14 thereby defining a semi-spherical cavity. Body 14 also defines inner and outer surfaces 42, 44, respectively-portions of which may be spherical in shape. Inner surface 42 defines a plurality of threads 46 proximate end 48 of body 14.

Plate 16 provides an engagement surface for a portion of assembly 26 as described in greater detail hereinbelow. Plate 16 may be made from conventional metals and metal alloys such as steel. Plate 16 is generally circular in shape and is centered about axis 28 when assembled in clamp 10. A radially outer surface of plate 16 defines a plurality of threads 50 configured to mate with threads 46 on inner surface 42 of body 14. Plate 16 includes a semi-spherical recess 52 in one axial end configured to receive arm 20.

Arms 18, 20 are provided to grip part 12 therebetween. Arms 18, 20 may be made from conventional metals and metal alloys. Arms 18 and 20 are spaced from one another and engage opposing sides of part 12.

Arm 18 grips a first side of part 12 and is partially disposed about portion 32 of body 14. As shown in FIG. 2, arm 18 is generally rectangular when viewed in perspective or in cross-section. Arm 18, however, defines a spherical surface 54 one a first side 56 of arm 18 proximate one longitudinal end 58. Surface 54 is shaped complementary to surface 44 of body 14. Arm 18 further defines a recess 60 in side 56 of arm 18 at an opposite longitudinal end 62, thereby creating a shoulder 64 that extends laterally across arm 18. Recess 60 is configured to receive wear pad 22. Finally, arm 18 defines a bore 66 extending from side 56 of arm 18 to an opposite side 68, intermediate ends 58, 62 of arm 18. Bore 66 may be generally cylindrical in shape and may have a first diameter proximate side 56 and a second diameter, greater than the first diameter, proximate side 68 thereby forming radially inner and outer shoulders 70, 72. Bore 66 is sized relative to a portion of assembly 26 as described in greater detail hereinbelow.

Arm 20 grips a second side of part 12 and is partially disposed within opening 40 of body 14. Arm 20 includes a generally rectangular portion 74 and a spherical portion 76 at one longitudinal end 78. Portions 74, 76 may be integral with one another.

Portion 74 defines a recess 80 in a side 82 of arm 20 at one longitudinal end 84 of arm 20, thereby creating a shoulder 86 that extends laterally across arm 20. Recess 80 is configured to receive wear pad 24. Portion 74 also defines a bore 88 extending from side 82 of arm 20 to an opposite side 90, intermediate ends 78, 84 of arm 20. Bore 88 may be generally cylindrical in shape and may have a first diameter proximate side 82 and a second diameter, greater than the first diameter, proximate side 90 thereby forming radially inner and outer shoulders 92, 94. Bore 88 is sized relative to a portion of assembly 26 as described in greater detail hereinbelow.

Portion 76 of arm 20 defines a spherical surface 96 that is shaped complementary to surface 42 of body 14. Portion 76 is configured to be received within opening 40 and recess 52 of plate 16. The diameter of opening 40 at end 38 of body 14 is smaller than the diameter of portion 76 of arm 20. As a result, arm 20 is prevented from exiting through opening 40 on end 38 of body 14. Arm may be inserted into body 14 at end 48 of body 14 prior to insertion of plate 16 in opening 40. The spherical arrangement of arm 20 and body 14 allows arm 20 to pivot about multiple axes including axis 28. In particular, the arrangement allows arms 18, 20 (and attached components) to rotate a full three-hundred and sixty (360) degrees about axis 28. Arms 18, 20 (and attached components can also, for example, pivot about an axis (not shown) that is perpendicular to axis 28 and extends outwardly from the page containing FIG. 2 to the extent of the clearance between the opening 40 at end 38 of body 14 and portion 74 of arm 20. This arrangement is advantageous because it enables clamp 10 to adapt unusual angles/draft angles found on many parts. Portion 76 defines a bore 98 that extends longitudinally from end 78 of arm 20 to bore 88 and is in communication with bore 88. Bore 98 may be generally cylindrical in shape and may be centered about axis 28 upon assembly of clamp 10.

Wear pads 22, 24 are provided to increase frictional engagement of part 12 and to increase the life of clamp 10. Pads 22, 24 may be made of conventional metals and metal alloys such as steel and the surfaces of pads 22, 24 that are configured to engage part 12 may be comprise a brazed carbide for increased strength. The surfaces may also be uneven (e.g., knurled) to increase frictional engagement with part 12. It should be understood that pads of various sizes, compositions, and configurations may be secured to arms 18, 20 depending on the characteristics (e.g., thickness) of part 12. Each of pads 22, 24 may include a threaded shank 100, 102, respectively, configured to be received within a corresponding threaded bore 104, 106 formed in arms 18, 20. Each of pads 22, 24, may further include a head 108, 110, respectively, that is received within a corresponding recess 60, 80 in arms 18, 20 and abuts against a corresponding shoulder 64, 86 in arms 18, 20.

Assembly 26 is provided to secure the position of arms 18, 20 relative to body 14 once part 12 has been secured between arms 18, 20. Assembly 26 may include a plurality of members 112, 114, 116 as well as washers 118.

Member 112 is provided to allow adjustment of assembly 26 by causing movement of member 114. Member 112 may comprise a fastener. In the illustrated-embodiment, member 112 comprises a screw. It should be understood, however, that member 112 may comprise another type of fastener, such as a bolt or pin or another structure capable of causing movement in member 114. Member 112 is disposed about an axis 120 and may include a shank 122 and a head 124. Shank 122 is disposed within bores 66, 88 in arms 18, 20 and extends across the gap between arms 18, 20. At least a portion of shank 122 (an one axial end of shank 122 opposite head 124) may be threaded. Head 124 may be integral with shank 122 and is received within the greater diameter portion of bore 66 in arm 18. As such, head 124 abuts against shoulder 70. Head 124 may include a socket (now shown) or may be sized to allow sufficient clearance relative to shoulder 72 of bore 66 so as to allow rotation of member 112 about axis 120. Alternatively, member 112 may extend outwardly from bore 66 to allow rotation of member 112 by hand or a suitable tool.

Member 114 is provided to urge member 116 in a first axial direction along axis 28. In the illustrated embodiment, member 114 comprises a nut having a plurality of threads (not shown) configured to engage threads on shank 122 of member 112. It should be understood, however, that member 114 may assume a variety of configurations provided that member 114 can effect movement of member 116 responsive to movement of member 112. Member 114 is disposed within the larger diameter portion of bore 88 of arm 20 and is disposed about member 112 and axis 120. Member 114 is generally cylindrical in shape, but defines a flat cam surface 126 on one side for a purpose described hereinbelow. Surface 126 may be disposed at an angle relative to both of axes 28, 120.

Member 116 is provided to selectively engage plate 16 to lock arms 18, 20 into place relative to body 14. In the illustrated embodiment, member 116 comprises a pushrod. It should be understood, however, that member 116 may also assume a variety of configurations provided that member 116 can engage plate 16 responsive to movement of members 112, 114. Member 116 is disposed about axis 28 upon assembly of clamp 10. Member 116 may be generally cylindrical in shape and is received within bore 98 of arm 20. Member 116 defines a spherical surface 128 at one longitudinal end shaped complementary to recess 52 in plate 16. Member 116 further defines a flat cam surface 130 at an opposite longitudinal end shaped complementary to cam surface 126 on member 114. Surface 130 extends parallel to surface 126 and may be disposed at an angle relative to axes 28, 120.

Washers 118 are provided to allow variation in the pressure applied to part 12 between wear pads 22, 24 before movement of members 114, 116. Washers 118 may comprise belleville washers. It should be understood that washers 118 may be replaced with a variety of other structures and materials that would resist movement of member 114 until part 12 is securely held between wear pads 22, 24. Washers 118 are disposed about shank 122 of member 112 between member 114 and shoulders 92, 94 formed in bore 88 in arm 20.

Clamp 10 may be operated by first moving arms 18, 20 relative to body 14 and orienting arms 18, 20 so as to engage opposite sides of part 12. Once arms 18, 20 are in position, member 112 of assembly 26 may be rotated in a first rotational direction about axis 120. Rotation of member 112 causes movement of nut 114 along axis 120 and draws arms 18, 20 closer together. This action aligns arms 18, 20 relative to part 12 and creates a secure engagement of part 12. Subsequently, continued rotation of member 112 causes nut 114 to collapse washers 118 and the engagement of cam surfaces 126, 130 causes movement of member 116 in a first axial direction along axis 28 towards plate 16. Once member 116 engages plate 16, arms 18, 20 are secured into position relative to body 14.

A clamp 10 in accordance with the present invention represents a significant improvement as compared to conventional clutches. In particular, the arms 18, 20 of clamp 10 securely engage part 12 prior to being locked into place relative to body 14 of clamp 10. As a result, part 12 is not susceptible to movement as clamp 10 is locked. Further, any number of clamps 10 may be used to secure a part 12 without causing distortion of the part.

While the invention has been shown and described with reference to one or more particular embodiments thereof, it will be understood by those of skill in the art that various changes and modifications can be made without departing from the spirit and scope of the invention.

I claim:

1. A clamp for gripping a part, comprising:

a body defining an opening closed at one end by a plate;

a first arm partially disposed within said opening and extending outwardly therefrom, said first arm configured to engage a first side of said part;

a second arm partially disposed about said body and spaced from said first arm, said second arm configured to engage a second side of said part; and, an assembly including a first member extending along a first axis through at least portions of said first and second arms;

a second member disposed within a first bore in said first arm and configured to receive said first member; and, a third member disposed within a second bore in said first arm, said third member disposed about a second axis extending perpendicular to said first axis;

wherein rotation of said first member in a first rotational direction causes movement of said second member along said first axis in a first axial direction and corresponding movement of said third member along said second axis whereby said third member engages said plate in said body to secure a position of said first and second arms relative to said body.

2. The clamp of claim 1 wherein said body has radially inner and outer spherical surfaces, said first arm has a spherical surface complementary to said inner spherical surface of said body and said second arm has a spherical surface complementary to said outer spherical surface of said body.

3. The clamp of claim 1 wherein a radially inner surface of said body defines a first plurality of threads and said plate includes a second plurality of threads configured to mate with said first plurality of threads.

4. The clamp of claim 1 wherein at least one of said first and second arms includes a wear pad mounted thereon and configured to engage said part.

5. The clamp of claim 1, further comprising a washer disposed about said first member wherein movement of said second member along said first axis in said first axial direction compresses said washer.

6. The clamp of claim 1 wherein said second member has a first cam surface and said third member has a second cam surface configured to engage said first cam surface.

7. The clamp of claim 6 wherein said first and second cam surfaces extend parallel to one another.

8. The clamp of claim 6 wherein said first and second cam surfaces are disposed at an angle relative to both of said first and second axes.

9. A clamp for gripping a part, comprising:

a body defining an opening closed at one end by a plate;

a first arm partially disposed within said opening and extending outwardly therefrom, said first arm configured to engage a first side of said part;

a second arm partially disposed about said body and spaced from said first arm, said second arm configured to engage a second side of said part; and, an assembly including a fastener extending along a first axis through at least portions of said first and second arms;

a nut disposed within a first bore in said first arm and configured to receive said fastener; and, a pushrod disposed within a second bore in said first arm, said pushrod disposed about a second axis extending perpendicular to said first axis wherein rotation of said fastener in a first rotational direction causes movement of said nut along said first axis in a first axial direction and corresponding movement of said pushrod along said second axis whereby said pushrod engages said plate in said body to secure said first and second arms relative to said body.

10. The clamp of claim 9 wherein said body has radially inner and outer spherical surfaces, said first arm has a spherical surface complementary to said inner spherical surface of said body and said second arm has a spherical surface complementary to said outer spherical surface of said body.

11. The clamp of claim 9 wherein a radially inner surface of said body defines a first plurality of threads and said plate includes a second plurality of threads configured to mate with said first plurality of threads.

12. The clamp of claim 9 wherein at least one of said first and second arms includes a wear pad mounted thereon and configured to engage said part.

13. The clamp of claim 9, further comprising a washer disposed about said fastener wherein movement of said nut along said first axis in said first axial direction compresses said washer.

14. The clamp of claim 9 wherein said nut has a first cam surface and said pushrod has a second cam surface configured to engage said first cam surface.

15. The clamp of claim 14 wherein said first and second cam surfaces extend parallel to one another.

16. The clamp of claim 14 wherein said first and second cam surfaces are disposed at an angle relative to both of said first and second axes.

17. A clamp for gripping a part, comprising:

a body defining an opening closed at one end by a plate;

a first arm partially disposed within said opening and extending outwardly therefrom, said first arm configured to engage a first side of said part;

a second arm partially disposed about said body and spaced from said first arm, said second arm configured to engage a second side of said part; and, means for securing said first and second arms relative to said body.

18. The clamp of claim 17 wherein said body has radially inner and outer spherical surfaces, said first arm has a spherical surface complementary to said inner spherical surface of said body and said second arm has a spherical surface complementary to said outer spherical surface of said body.

19. The clamp of claim 17 wherein a radially inner surface of said body defines a first plurality of threads and said plate includes a second plurality of threads configured to mate with said first plurality of threads.

20. The clamp of claim 17 wherein at least one of said first and second arms includes a wear pad mounted thereon and configured to engage said part.

* * * * *